United States Patent [19]
Nahar

[11] Patent Number: 5,773,729
[45] Date of Patent: Jun. 30, 1998

[54] OVERLOAD PROTECTED LOADCELL

[75] Inventor: Rathindra Nahar, Duluth, Ga.

[73] Assignee: NCR Corporation, Dayton, Ohio

[21] Appl. No.: 718,621

[22] Filed: Sep. 17, 1996

[51] Int. Cl.$^6$ ...................................................... G01L 1/00
[52] U.S. Cl. ................................ 73/862.382; 73/862.634
[58] Field of Search ...................... 73/862.382, 862.634, 73/862.639, 862.632, 862.627

[56] References Cited

U.S. PATENT DOCUMENTS

| | | | |
|---|---|---|---|
| 4,107,985 | 8/1978 | Sommer | 73/862.382 X |
| 4,143,727 | 3/1979 | Jacobson | 73/862.634 X |
| 4,170,270 | 10/1979 | Sette et al. | 73/862.382 X |
| 4,219,089 | 8/1980 | Gard et al. | 73/862.634 X |
| 4,338,825 | 7/1982 | Amlani et al. | 73/862.382 |
| 4,344,496 | 8/1982 | Langlais et al. | 73/862.634 X |
| 4,438,823 | 3/1984 | Hussels et al. | 73/862.382 X |
| 4,488,611 | 12/1984 | Jacobson | 177/211 |
| 4,505,345 | 3/1985 | Jetter | 177/211 |
| 4,632,198 | 12/1986 | Uchimura | 73/862.382 X |
| 4,653,599 | 3/1987 | Johnson | 73/862.82 X |
| 4,718,287 | 1/1988 | Mishiborsky | 73/802.634 X |
| 4,744,709 | 5/1988 | Hertel et al. | 414/21 |
| 4,836,036 | 6/1989 | Jetter | 73/862.65 |
| 4,949,799 | 8/1990 | Wernimont | 177/211 |
| 4,971,177 | 11/1990 | Nojiri et al. | 186/61 |
| 5,052,505 | 10/1991 | Naito et al. | 73/862.634 X |
| 5,139,100 | 8/1992 | Brauneis | 177/25.15 |
| 5,183,125 | 2/1993 | Schurr | 177/211 |
| 5,237,864 | 8/1993 | Castle et al. | 73/862.634 X |

*Primary Examiner*—Elizabeth L. Dougherty
*Attorney, Agent, or Firm*—Paul W. Martin

[57] ABSTRACT

A loadcell for a weighing scale includes an elongate beam having mounting and free ends spaced apart along a beam axis to define a cantilever. The beam includes an upper surface spaced above the beam axis, and a lower surface spaced below the beam axis. A central aperture extends through the beam to define a plurality of spaced apart necks. The beam lower surface at the free end is spaced closer to the beam axis than at the mounting end to define a step. And, a plurality of strain gages are mounted to the beam adjacent to the necks for measuring strain thereat. Mounted in a scale housing, the beam free end abuts a housing mounting pad for limiting travel of the loadcell and providing overload protection therefor.

9 Claims, 2 Drawing Sheets

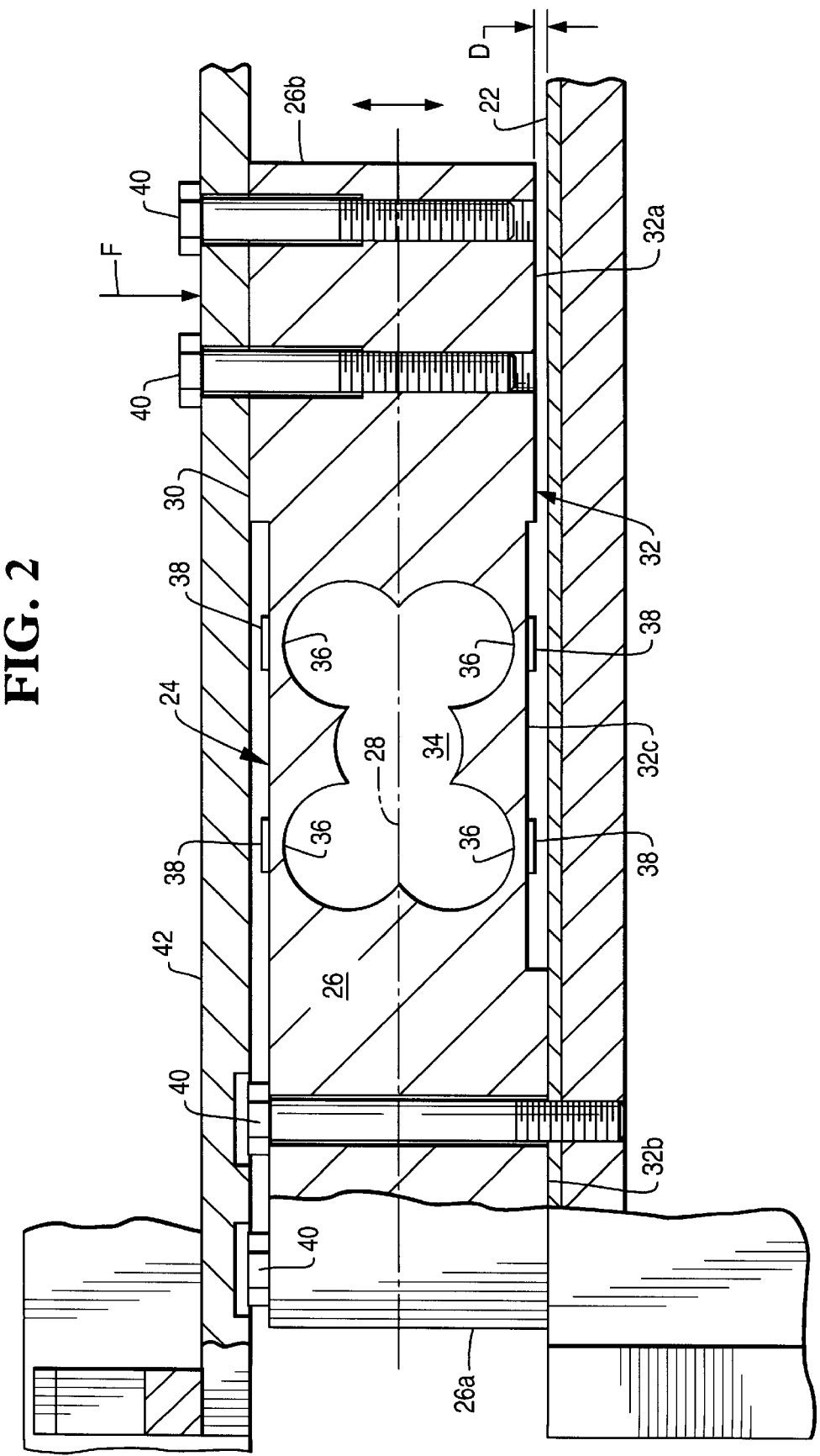

OVERLOAD PROTECTED LOADCELL

BACKGROUND OF THE INVENTION

The present invention relates generally to weighing scales, and, more specifically, to a weighing scale loadcell having overload protection.

In one type of weighing scale, a loadcell in the form of an elongate beam is mounted as a cantilever, with a mounting end being fixedly mounted, and a free end supporting a scale plate on which articles may be placed for being weighed. The weight of the articles causes the loadcell beam to deflect and experience corresponding tension and compression bending stresses therein. The center of the beam includes a through aperture which maintains torsional rigidity of the beam and concentrates stress at local necks. Strain gages are suitably mounted at the necks for measuring strain which is directly proportional to the bending force exerted on the beam, which in turn may be used for determining the weight of the articles placed on the scale plate.

A typical scale has a specific weight limit, which if exceeded can damage the various components of the scale including the beam itself. Accordingly, the prior art includes various features for providing overload protection of the scale to prevent excessive bending of the loadcell. For example, suitable stops may be provided below the scale plate to prevent excessive movement thereof. Or, bending of the loadcell itself may be limited by a suitable stop such as an adjustable set screw.

More specifically, in one conventional weighing scale, a vertically extending set screw is mounted below the free end of the loadcell and is suitably adjusted to prevent the loadcell from deflecting beyond a predetermined limit. However, the allowed deflection of the loadcell during normal operation is extremely small over the weighing range of the scale. In one example, the scale may have a weighing limit of 50 pounds, with the deflection limit of the loadcell being about 9 mils. The set screw therefore requires very accurate adjustment and is then typically locked in adjustment by using a suitable adhesive. Since the 9 mil deflection limit is extremely small, just a few mils variation thereof out of adjustment can lead to undesirable permanent damage of the loadcell.

One advantage of the set screw, however, is that it effectively eliminates errors due to manufacturing tolerance and stack-up variations thereof. Without an adjustable set screw, the various joints between the loadcell and its mounting support must be accurately manufactured to extremely small tolerances so that when the loadcell is assembled in its housing, the resulting tolerance between the loadcell free end and an abutting structure is closely within the desired load limit. This is typically not practical, however, in view of the small limit of loadcell deflection on the order of 9 mils, especially when considering the goal of maintaining reduced cost of manufacture, assembly, and calibration.

SUMMARY OF THE INVENTION

A loadcell for a weighing scale includes an elongate beam having mounting and free ends spaced apart along a beam axis to define a cantilever. The beam includes an upper surface spaced above the beam axis, and a lower surface spaced below the beam axis. A central aperture extends through the beam to define a plurality of spaced apart necks. The beam lower surface at the free end is spaced closer to the beam axis than at the mounting end to define a step. And, a plurality of strain gages are mounted to the beam adjacent to the necks for measuring strain thereat. Mounted in a scale housing, the beam free end abuts a housing mounting pad for limiting travel of the loadcell and providing overload protection therefor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is an elevational, sectional view of the loadcell illustrated in FIG. 1 and taken along line 2—2.

DESCRIPTION OF THE PREFERRED EMBODIMENT(S)

Figure 1:
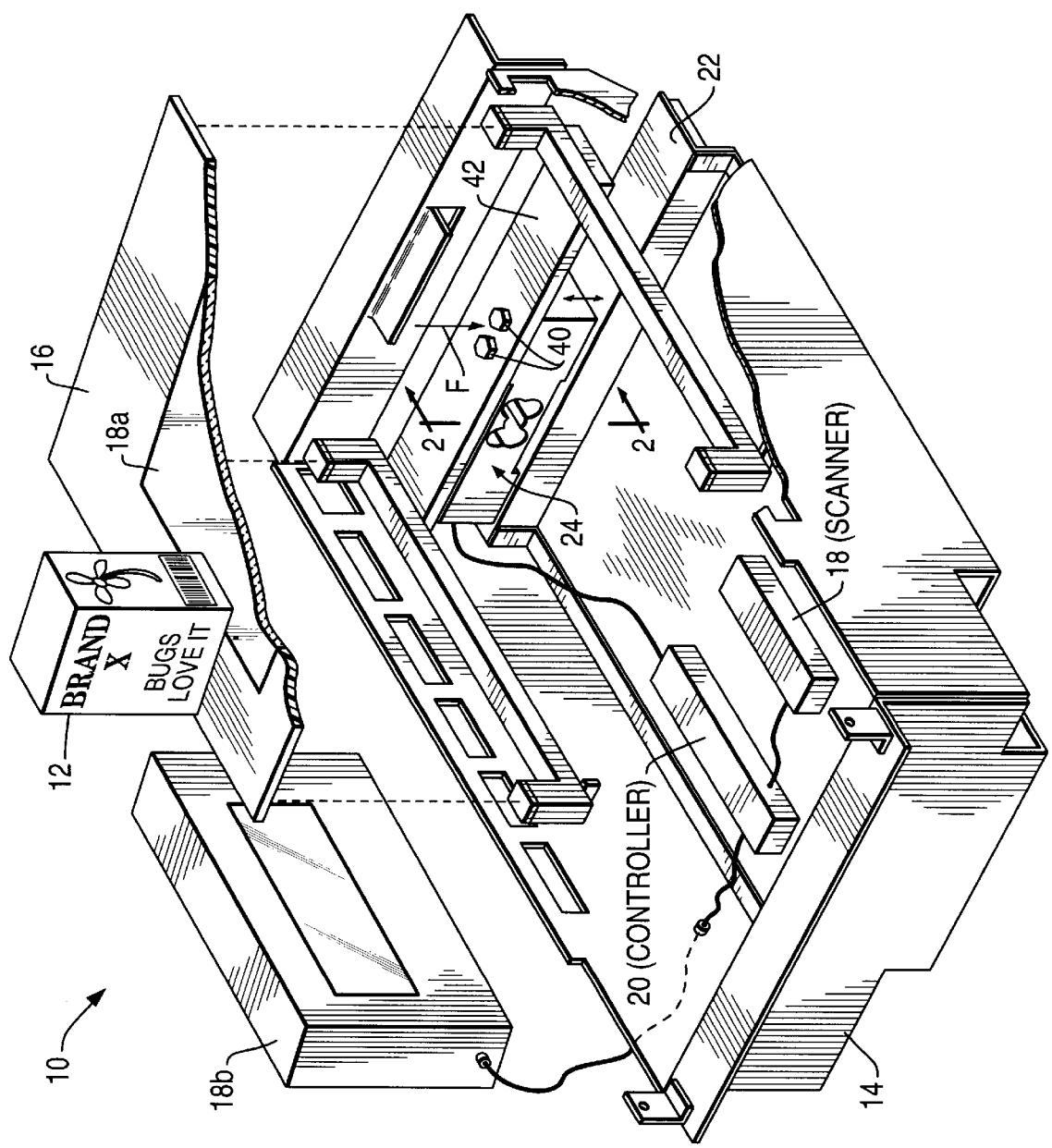
FIG. 1 is an exploded, partly sectional, schematic view of an exemplary weighing scale including an overload protected loadcell therein.

Illustrated schematically in FIG. 1 is an exemplary embodiment of a weighing scale 10 configured for use in a typical retail establishment for weighing a consumer product 12. In the exemplary configuration illustrated, the scale 10 is combined with a conventional laser bar code scanner for also conventionally reading the bar code found on the side of the product 12.

More specifically, the scale 10 includes a suitable housing 14 in the form of a box with an open top in which are mounted various components of the scale assembly. Suitably mounted atop the housing 14 is a flat scale plate 16 on which the product 12 may be placed for the weighing thereof. Suitably mounted in part inside the housing 14 is a conventional laser bar code scanner 18 which cooperates with a horizontal window 18a disposed coplanar in the scale plate 16, and with a vertical window 18b disposed adjacent to the scale plate 16 for projecting a laser beam across the product bar code and receiving back scattered light which is decoded in a conventional manner. A conventional controller 20 is operatively joined to the scanner 18 and to the scale 10 itself for controlling operation of both weighing the product 12 as well as reading the bar code label thereon.

The housing 14 further includes a flat and rigid mounting pad 22, which in the exemplary embodiment illustrated in FIG. 1 is formed of relatively inexpensive, thin sheet metal suitably attached to a relatively rigid mounting bar integral in the housing 14 for providing a rigid base for the scale 10. In accordance with the present invention, a loadcell 24 in the form of a cantilever is suitably joined to the mounting pad 22 and is operatively joined to the controller 20 for measuring strain induced by weight of the product 12.

As shown in FIG. 2, the loadcell 24 includes an elongate cantilever beam 26 having a proximal, mounting end 26a and an opposite distal, free end 26b spaced longitudinally from the mounting end 26a along a longitudinal centerline beam axis 28 to define the cantilever. The beam 26 also includes an upwardly facing, upper surface 30 extending the length of the beam 26 which is spaced above and generally parallel to the beam axis 28. The beam 26 also includes a downwardly facing, lower surface 32 extending the length of the beam 26 which is generally parallel to and spaced below the beam axis 28.

A central aperture 34 extends laterally through the beam 26 from side-to-side to define a plurality of spaced apart necks 36 of minimum cross section. A plurality of conventional strain gages 38 are suitably fixedly mounted, by an adhesive for example, to the beam 26 adjacent to respective ones of the necks 36 for measuring strain thereat in a conventional manner. Each of the strain gages 38 is suitably electrically joined to the controller 20 shown in FIG. 1.

In accordance with the present invention, the beam lower surface 32 at the free end 26b is spaced closer to the beam axis 28 than at the mounting end 26a to define a step 32a therebetween. The beam lower surface 32 at the mounting end 26a defines a mounting land 32b, and the step 32a has a predetermined depth D measured inwardly toward the beam axis 28 relative to the mounting land 32b.

As shown in FIG. 2, the mounting end 26a of the loadcell 24 is suitably fixedly joined on the mounting pad 32b by one or more removable threaded fasteners 40 which extend vertically through corresponding bores through the beam mounting end 26a and threadingly engage the mounting pad 22.

The beam free end 26b up to the mounting land 32b is preferably spaced above the mounting pad 22 by the step depth D for limiting deflection of the beam free end by abutment thereagainst for self-providing overload protection of the loadcell.

The fasteners 40 fixedly join the beam 26 to the housing 14 at the mounting pad 22. The free end 26b of the beam 26 in turn is suitably fixedly joined to a frame or platform 42 as shown in FIGS. 1 and 2. The platform 42 has a conventional H-bar configuration with a cross bar and two end bars having four corners upon which the scale plate 16 may simply rest. The cross bar of the platform 42 is preferably fixedly joined to the free end 26b of the beam 26 by one or more of the threaded fasteners 40 which extend downwardly through holes in the platform 42 and threadingly engage corresponding threaded apertures in the beam distal end 26b.

As shown in FIG. 1, the product 12 is placed atop the scale plate 16 for being weighed, with the weight thereof creating a downwardly directed force F which is exerted atop the beam free end 26b as shown in more particularity in FIG. 2. The applied force F then causes the beam free end 26b to deflect downward toward the mounting pad 22 thus bending the beam 26 in a cantilever fashion. The reaction bending loads are carried through the beam mounting end 26a and into the mounting pad 22.

The corresponding tension and compression bending stresses generated in the beam 26 are concentrated in the necks 36, with the strain gages 38 positioned thereat measuring strain in a conventional manner. The measured strain is communicated to the controller 20 which is suitably calibrated for determining the weight of the product 12 corresponding with the specific amount of strain detected in a conventional manner. Accordingly, the scale plate 16 and platform 42 are freely supported atop the beam free end 26 so that a product 12 placed thereon correspondingly bends the beam 26 from which the weight of the product 12 may be determined.

By accurately positioning the step 32a of the beam lower surface 32 relative to the mounting land 32b thereof, self-overload protection of the beam 26 may be effected upon abutment of the free end 26b and the mounting pad 22 when downward travel reaches the limit of the provided clearance therebetween.

This overload protection of the loadcell 10 is effected without a conventional adjustable set screw, or without multi-components which each require accurate manufacturing tolerance for providing overload protection. Overload protection is readily provided within the beam 26 itself by the specifically configured beam lower surface 32. As shown in FIG. 2, the mounting pad 22 is flat preferably along its entire length under the beam 26, and may be readily provided by using flat sheet metal which may be thick enough to provide its own rigidity, or may be relatively thin and supported upon a rigid bar as illustrated.

The beam 26 is mounted on the mounting pad 22 so that the beam axis 28 is spaced parallel to the mounting pad 22. The mounting land 32b is preferably flat and directly abuts the mounting pad 22, with the pair of fasteners 40 providing a fixed and rigid joint thereat. The step 32a is also preferably flat and parallel to the mounting land 32b, and is initially spaced above the mounting pad by the depth D of the step 32a.

In this arrangement, the step 32a is accurately positioned relative to the mounting land 32b and may be readily manufactured in a common machining operation using the mounting land 32b as a reference from which the step 32a may be accurately formed by suitable machining of metal therefrom with a single machining tolerance therefor. In this way, once the beam 26 is fastened to the flat mounting pad 22, the initial clearance D is accurately provided automatically without the need for any adjustment, such as that provided by suitable shims, and without stack-up tolerances which would alter the desired initial clearance. For example, the initial depth D of the step 32a and the corresponding clearance provided thereby in an exemplary embodiment is about 9 mils which is a very small clearance. This very small clearance is accurately created automatically by mounting the pre-machined beam 26 on the mounting pad 22.

In the preferred embodiment illustrated in FIG. 2, the depth D of the step 32a is sized sufficiently small so that cantilever deflection by bending of the beam free end 26b relative to the mounting end 26a over the depth D does not exceed about two percent (2%) yield stress of the beam 26 itself. The beam free end 26b may be displaced downwardly only until it abuts the oppositely facing mounting pad 22 which prevents further downward travel thereof for providing overload protection of the loadcell 10. In an exemplary embodiment for a metal beam 26, the initial step depth D of about 9 mils ensures that the bending stress within the beam 26 at the corresponding necks 36 does not exceed the 2% yield stress of the beam material.

In the exemplary embodiment illustrated in FIG. 2, the mounting land 32b only extends over the region of the pair of fasteners 40 for providing an effective compression joint thereat. The mounting land 32b extends to about the central aperture 34. And, the step 32a is provided along the beam free end 26b to at least about the central aperture 34 for ensuring that the beam 26 may deflect without obstruction until the overload limit is reached upon abutment of the step 32a and the mounting pad 22.

In the exemplary embodiment illustrated in FIG. 2, the beam 26 further includes a central recess 32c extending along the lower surface 32 between the mounting land 32b and the step 32a for receiving at least one of the strain gages 38, and in the exemplary embodiment both of the lower strain gages 38. The strain gages 38 may be suitably covered with a protective coating without interfering with the free bending travel of the beam 26 and step 32a. The step 32a in effect extends from the distal-most end of the beam 26 up to the mounting land 32b for preventing obstruction between the beam 26 and the mounting pad 22 until the step 32a reaches its overload travel limit in abutment against the pad 22.

The central aperture 34 may take any suitable configuration along with the necks 36 to provide suitable torsional rigidity of the beam 26 with suitable stress concentration at the necks 36 so that the strain gages 38 may accurately measure strain to determine the corresponding weight of the product 12. As shown in FIG. 2, the beam central aperture 34 may be defined by two pairs of intersecting corner holes symmetrically intersecting a center hole along the beam axis 28 for defining four identical necks 36 between the corner holes and the beam upper and lower surfaces 30, 32. Two of the strain gages 38 are mounted on the beam upper surface 30 adjacent to the corresponding necks 36, and two of the strain gages 38 are mounted on the beam lower surface recess 32c opposite the corresponding necks 36.

As disclosed above, the overload protection clearance represented by the step 32a is built into the lower surface of the beam 26 itself and thereby eliminates the conventional set screw and required adjustment thereof. Substantially small overload clearances on the order of about 9 mils may be accurately implemented and are necessarily permanent without the need for field adjustment. The overload clearance is automatically effected by simply fastening the beam mounting end 26a directly to the mounting pad 22 which automatically positions the step 32a at the required spacing from the opposing portion of the mounting pad 22. The mounting pad 22 itself does not require any accurate machining of a cooperating abutting portion which would lead to manufacturing tolerance stack up problems. The mounting pad 22 may be readily manufactured by providing a suitably flat plate such as formed sheet metal of suitable thickness with or without a rigid backing plate. Assembly cost of the scale 10 will therefore be lowered, and field service of the scale 10 will be significantly easier since adjustment of the loadcell is no longer required.

Although the invention has been described in the environment of a combination scale and laser scanner, it may be used alone in any scale application in which a cantilever loadcell provides the weighing mechanism. The loadcell is simply fastened to a suitable mounting pad at its mounting end, with the free end having the corresponding inward step for providing unobstructed bending travel of the loadcell within its operating range until the free end of the loadcell bottoms out on the mounting pad upon exceeding the maximum weight capability of the loadcell. The loadcell is thereby protected against any further bending thereof which would overload or otherwise damage the loadcell itself.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A loadcell for a weighing scale comprising:
   an elongate beam including:
      mounting and free ends spaced apart along a longitudinal centerline beam axis to define a cantilever;
      an upper surface spaced above said beam axis;
      a lower surface spaced below said beam axis;
      a central aperture extending laterally through said beam to define a plurality of spaced apart necks; and
      said beam lower surface at said free end being spaced closer to said beam axis than at said mounting end to define a step therebetween; and
   a plurality of strain gages mounted to said beam adjacent to respective ones of said necks for measuring strain thereat; and
   wherein said beam lower surface at said mounting end defines a mounting land, and said step has a depth measured inwardly therefrom, and said step depth is sized so that cantilever deflection of said beam free end relative to said mounting end over said depth does not exceed about two percent yield stress of said beam.

2. A loadcell according to claim 1 wherein said step and mounting land extend to about said central aperture.

3. A loadcell according to claim 1 in combination with said scale wherein said scale further includes a housing having a mounting pad, and said loadcell mounting end is fixedly joined directly to said mounting pad, with said free end being spaced from said mounting pad by said step depth for limiting deflection of said beam by abutment thereagainst.

4. An apparatus according to claim 3 wherein:
   said mounting pad is flat and spaced parallel to said beam axis;
   said mounting land is flat and abuts said mounting pad; and
   said step is flat and parallel to said mounting land, and is spaced above said mounting pad by said step depth.

5. An apparatus according to claim 4 further comprising a removable fastener extending through said beam mounting end and into said mounting pad for fixedly joining said beam to said housing.

6. An apparatus according to claim 5 further comprising a platform fixedly joined atop said beam free end for supporting a removable scale plate to weigh an article placed thereon.

7. An apparatus according to claim 6 wherein said step and mounting land extend to about said central aperture.

8. An apparatus according to claim 7 wherein said beam further comprises a recess extending along said lower surface between said mounting land and said step for receiving at least one of said strain gages.

9. An apparatus according to claim 8 wherein:
   said beam central aperture is defined by two pairs of intersecting corner holes symmetrically intersecting a center hole for defining four of said necks between said corner holes and said beam upper and lower surfaces; and
   a respective one of said strain gages is mounted on said beam upper and lower surfaces at said necks.

* * * * *